United States Patent [19]
Lindsay et al.

[11] Patent Number: 5,451,070
[45] Date of Patent: Sep. 19, 1995

[54] TREADLE DRIVE SYSTEM WITH POSITIVE ENGAGEMENT CLUTCH

[76] Inventors: Stuart M. W. Lindsay, R.R. 2 Lake Rd. Box 2248, Charlotte, Vt. 05445; James H. Wagner, 11 Wenonah Ave., Essex Junction, Vt. 05452

[21] Appl. No.: 67,578

[22] Filed: May 26, 1993

[51] Int. Cl.$^6$ .............. B62M 1/04; F16H 27/02; F16D 11/06
[52] U.S. Cl. .............. 280/252; 74/143; 192/71; 482/52; 482/64
[58] Field of Search .............. 74/143, 371, 372; 482/52, 64, 65, 114, 115; 280/11.115, 252, 221, 255; 192/71, 89.2, 89.21, 93 C, 107 T, 108

[56] References Cited

U.S. PATENT DOCUMENTS

| | | | |
|---|---|---|---|
| 582,957 | 5/1897 | Schellack et al. | 192/71 |
| 695,769 | 3/1902 | Turnbull | 192/71 X |
| 1,497,133 | 6/1924 | Cot | 192/71 X |
| 2,063,426 | 12/1936 | Galvin et al. | 192/71 X |
| 2,828,845 | 4/1958 | Thornton | 192/71 X |
| 3,101,827 | 8/1963 | Showalter | 192/71 X |
| 3,661,404 | 5/1972 | Bossaer | 280/255 |
| 4,574,649 | 3/1986 | Seol | 280/255 X |
| 4,828,284 | 5/1989 | Sandgren | 280/221 |
| 4,938,474 | 7/1990 | Sweeney et al. | 482/64 X |
| 5,040,652 | 8/1991 | Fish et al. | 192/71 X |
| 5,121,654 | 6/1992 | Fasce | 280/255 X |
| 5,135,447 | 8/1992 | Robards, Jr. et al. | 482/52 |
| 5,190,505 | 3/1993 | Dalebout et al. | 482/52 |
| 5,297,670 | 3/1994 | Yamaguchi | 403/329 X |

*Primary Examiner*—Edward K. Look
*Assistant Examiner*—John Ryznic
*Attorney, Agent, or Firm*—Donald W. Meeker

[57] ABSTRACT

A treadle drive system operates comfortably in a standing or seated position with two toe or heel end pivoting treadles. A flexible drive line (chain, cable, belt, etc.) from each treadle drives a pair of forward biased driving rings (having sprockets, pulleys, belt wheels, etc.) concentrically encircling and driving a hollow drive cylinder. Concentrically encircling the cylinder, a driven ring in turn drives a rotating device. A positive engagement clutch between the hollow cylindrical hub and the driven ring allows the driven ring to be engaged or disengaged from the drive cylinder. Opposing holes transversely through the hollow drive cylinder engage pins on outer ends of a V-shaped spring. The pins are normally engaged in mating openings on an interior surface of the driven ring. A push-pull shaft with a cup having a rigid rim pushes against the sloping sides of the spring to disengage the pins from the driven shaft only. Pulling the shaft releases the spring reengaging the pins in the driven shaft. The treadle drive system may be positioned in any desired orientation to provide a human power source producing a variable rotary output for transportation, exercise, tools and instruments, generators, or any other application requiring a rotary motion.

19 Claims, 3 Drawing Sheets

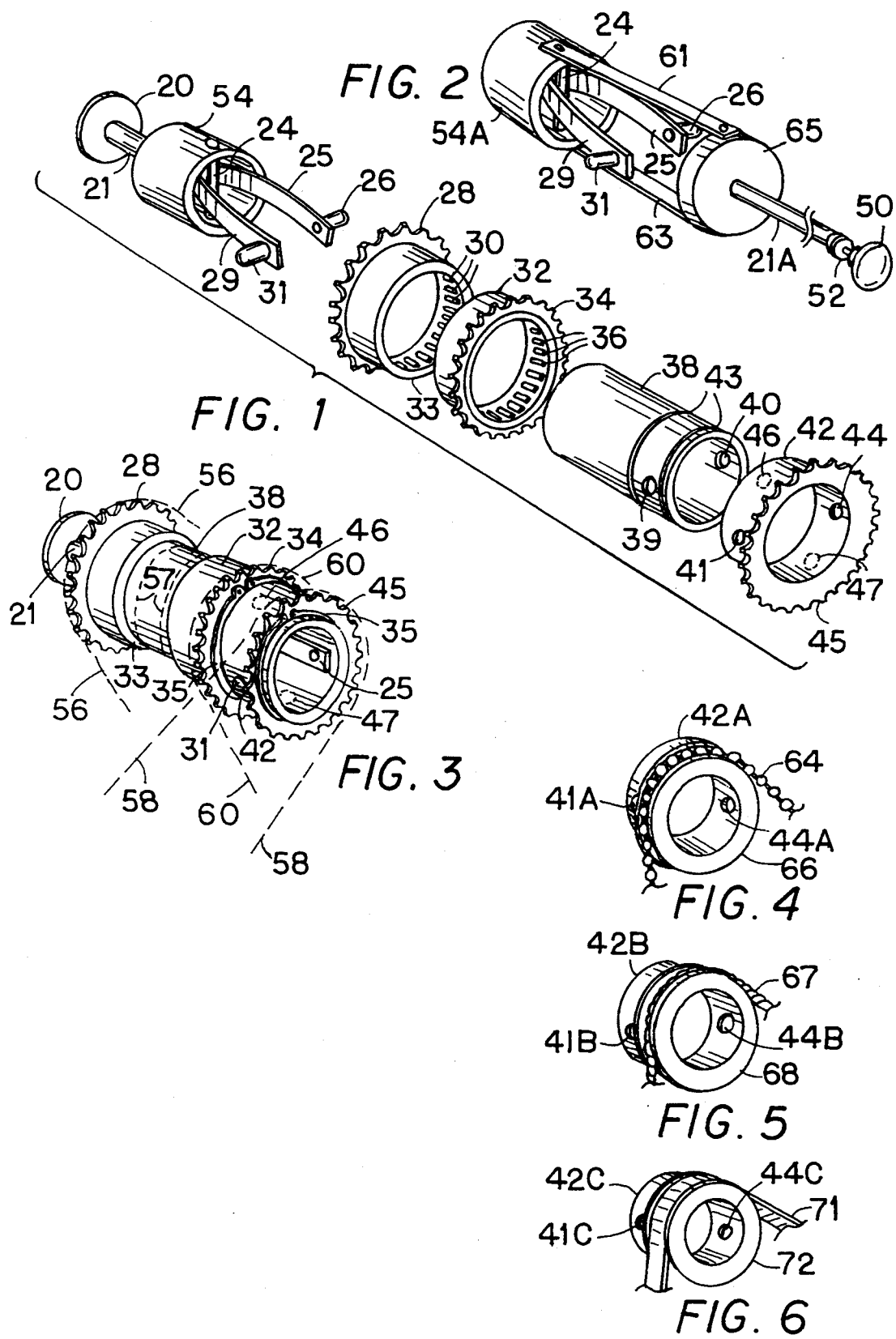

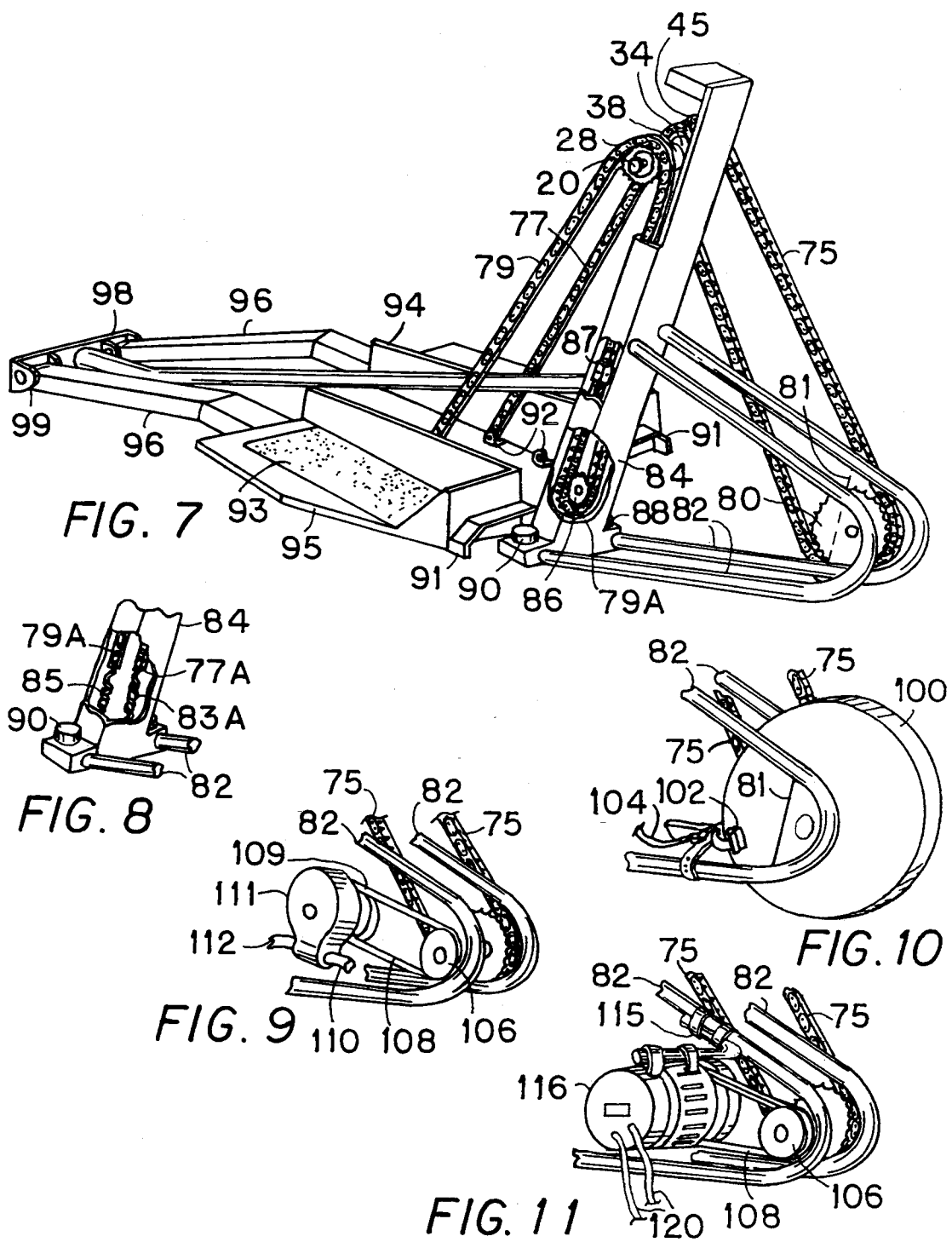

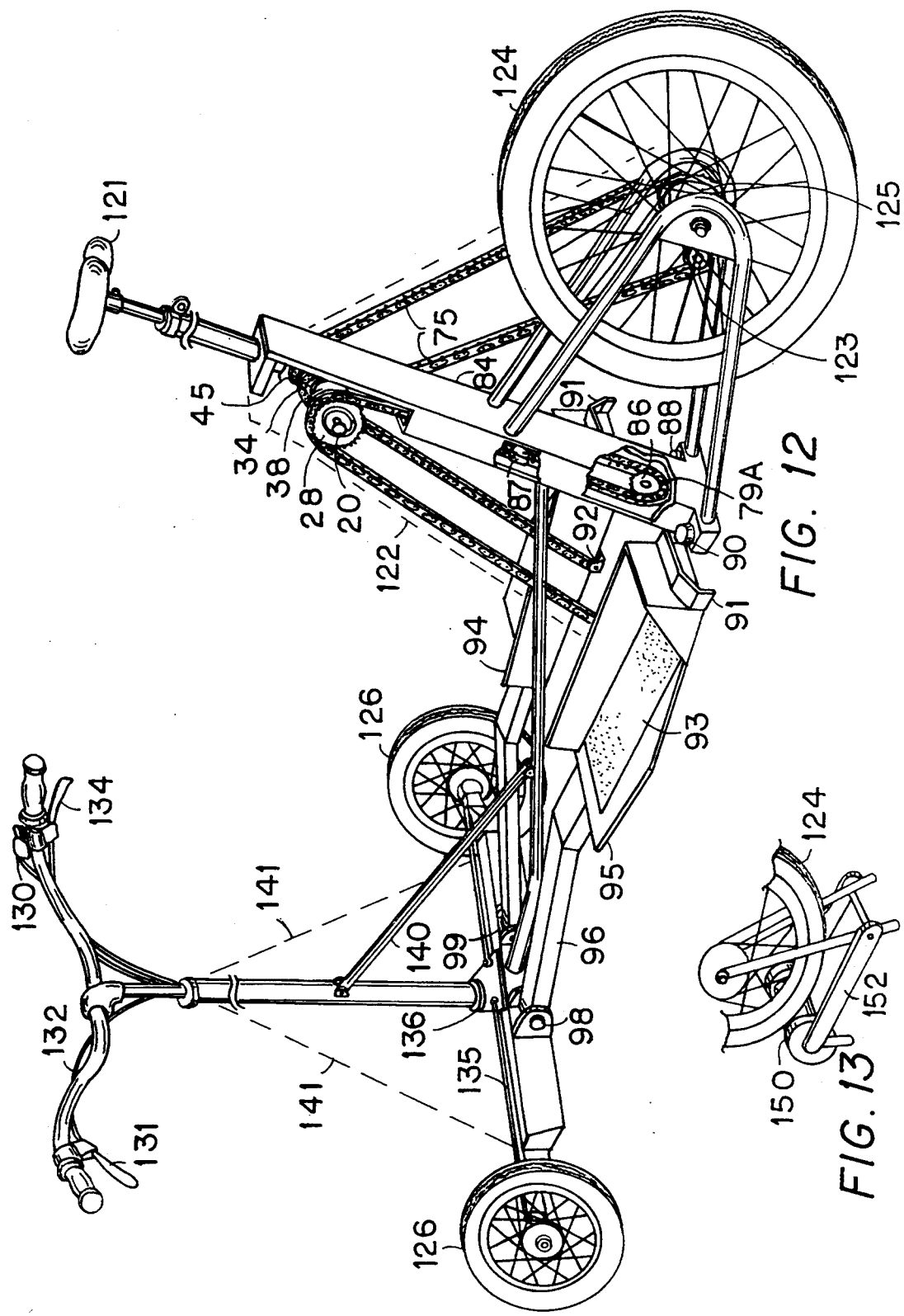

5,451,070

TREADLE DRIVE SYSTEM WITH POSITIVE ENGAGEMENT CLUTCH

BACKGROUND OF THE INVENTION

1. Technical Field

The present invention relates to treadle drive systems and in particular to a treadle drive system having a positive engagement clutch.

2. Description of the Prior Art

Exercise and ecologically beneficial transportation are two major concerns today. Although it is too early to determine all of the long range effects of various types of exercise, there seems to be a number of injuries associated with jogging or running and also with many other sports. Bicycling is very popular as a means of exercise and an ecologically sound mode of transportation. Again, there seems to be some evidence of the adverse strain developed in joints and muscles as a result of the joint flexion and muscle strain associated with the rotary motion of pedaling a traditional bicyle. Walking seems to be the primary exercise and mode of transportation agreed upon as healthy and ecologically sound with the least likelihood of joint injury and muscle strain. Not everyone is able to enjoy the health benefit of walking equally well, particularly those with injuries or disabilities.

In many locations away from traditional power sources, and particularly locations remote from electrical power lines, man-made rotary sources of power are indespensable. Producing such power requires an output of energy and when human power is applied the problems described above still apply in terms of a healthy efficient way for people to apply the power.

In traditional pedal drive systems, a rotary motion is imparted to the pedals, wherein power is imparted primarily on the down stroke with a variable lever effect. In a standing position to gain maximum power from the weight of the body, the circular motion is not as easily imparted, because of much flexing action of the foot and knee due to the complete circular travel of the foot.

In prior art U.S. Pat. No. 4,828,284, issued to Sandgren, a treadle drive system used in a standing position with a comfortable up and down movement imparts a maximum force on a downward stroke using the full weight of the body. Extreme flexing is avoided and only a natural minor bending of the knees is required as in walking or stair climbing. Motion and energy are produce by constant length levers or treadles which require an alternating right and left foot downward thrust with one foot in a natural stepping fashion with the opposite foot returning vertically to an elevated position for the next thrust. The drive sprocket of the Sandgren patent uses a non-reversing clutch which allows for forward motion only and not for backing up the vehicle.

In the Sandgren patent, the chain ends are attached to the rear of the treadles which pivot from a hinge positioned back from the forward steering column of the vehicle. Having the chain ends attach at the midpoint in the rear of each treadle creates a separation between the two ends of the chain requiring two crossover sprockets.

DISCLOSURE OF INVENTION

The present invention provides a treadle drive system operable in a standing or seated position with two alternating up and down treadles affording maximum transfer of power through application of body weight with a minimum of flexing in the legs and feet in a natural upright walking or stepping position or an upright seated position. For exercise, transportation, or providing human powered rotary motion the treadle system of the present invention provides optimum useful output with minimal effort using a natural healthy walking or stepping motion.

The treadle drive system of the present invention may be positioned in any desired orientation to provide a human power source producing a variable rotary output for transportation, exercise, tools and instruments, generators, or any other application requiring a rotary motion.

Reciprocating power is alternately supplied via a pair of toe or heel end, pivotally mounted platformed treadles to pull two ends of a flexible drive line (chain, cable, belt, etc.) to drive a pair of forward biased driving rings (having sprockets, pulleys, belt wheels, etc.) concentrically encircling and driving a hollow drive cylinder, which in turn drives another concentrically encircling driven ring, which in turn drives a rotating device. A positive engagement clutch between the hollow drive cylinder and the driven ring allows the driven ring to be engaged or disengaged from the drive cylinder. The positive engagement clutch enables the primary power drive system to be disengaged from the rotating device, allowing the rotating device to be isolated in a free-wheel or neutral condition independent of the primary drive system reversibly without interrupting the treadles and the line drive from the treadles.

A hollow drive cylinder has opposing paired holes through the cylinder and a concentrically encircling driven ring has opposing paired mating openings on an interior surface. Sliding within the cylinder, a simple push-pull shaft is attached to a cup having an open end with a rigid rim and a transverse rod across the open end. A V-shaped spring is captured between the transverse rod and a closed end of the cup, wherein the spring has sloping sides protruding out of the cup and two hardened steel pins on the outside ends of the sides of the V-shaped spring. With the pins positioned in the paired holes of the cylinder, the rigid rim of the cup sliding against the sides of the spring causes expansion and compression of the spring, thereby causing the pins to insert into and retract out of engagement with the mating openings in the driven ring to engage and disengage the drive system positively and simply. Such a clutch mechanism with two case hardened pins in positive engagement on two opposing sides between a drive cylinder and a driven ring provides a clutch which is easily fabricated and installed, simply operated by a knob, cable, or any push-pull means, and fabricated at a small fraction of the cost of traditional clutch plate means, and does not require lateral movement.

Having the pins of the V-shaped spring always positioned within the holes in the drive cylinder and maintaining the driven ring always in the same transverse position relative to the drive cylinder, held by retaining rings, shoulders, press fit or other mechanical means, enables the drive system to be maintained in proper alignment at all times. Having multiple paired openings in the driven ring enables the pins to engage the driven ring with a minimum degree of rotation of the drive cylinder relative to the driven ring.

In the present invention with a toe end pivot, the ends of the flexible drive line are attached on the inside edges anywhere along the treadles, evenly or unevenly positioned on each of the two treadles, in front of the maximum power application point at the rear of the treadles, thereby creating a constant length second class lever on each treadle. This arrangement increases the mechanical advantage over having the ends of the drive line attached at the rear of the treadles where the maximum force is applied. Attaching the drive line further forward increases the mechanical advantage. Thereby the mechanical advantage can be adjusted to suit the use to which the treadle system is being applied. The choice of attachment points on each treadle results in two constant length levers being of equal or unequal mechanical advantage. The unequal arrangement allows handicapped or injured individuals with unequal strength capabilities in the legs to use a treadle system designed to suit their needs.

The treadle pivoting from a hinge positioned at the front of the treadle drive system provides a second class lever . Providing an acute angle bend from the horizontal in the treadle arm inclines the treadle downward toward the back of the treadle at the foot pad. This food pad orientation maintains the foot in a more natural position, parallel to the operating surface, when the treadle is at the beginning of the stroke when power is applied, and in operating the treadle, this foot pad orientation tends to keep the operator's heel in firm contact with the treadle pad so that maximum weight and force are applied at the back of the treadle and also reduces the amount of flexing in the ankle and knee in a natural walking or stepping movement of the foot and leg.

In a single drive line embodiment of the invention, having the drive line ends attach on the inside edge of each treadle which are relatively closely spaced, in a natural standing relationship, enables closer placement of the two drive rings, thereby requiring only a single crossover idler gear between the two drive rings. A narrow vertical housing can then be used to encase the drive line and the idler gear over which the drive line passes. The single drive line embodiment creates a reciprocating up and down orientation of the two treadles. In an alternate embodiment with two separate drive lines driving two drive rings, the treadles operate independently of one another.

Integrating a seat support or tube, narrow drive-line encasing vertical housing, major frame connector, and treadle stops into one element saves considerably in materials, cost, and weight of the system.

BRIEF DESCRIPTION OF THE DRAWINGS

These and other details and advantages of our invention will be described in connection with the accompanying drawings, which are furnished only by way of illustration and not in limitation of the invention, and in which drawings:

FIG. 1 is an exploded perspective view of the positive engagement clutch with components aligned for assembly;

FIG. 2 is a perspective view of an alternate embodiment of the positive engagement clutch push-pull knob and V-shaped spring assembly;

FIG. 3 is a perspective view of the positive engagement clutch assembled;

FIG. 4 is an alternate embodiment of the drive ring using a beaded cable and roller gear;

FIG. 5 is an alternate embodiment of the drive ring using a cable and pulley;

FIG. 6 is an alternate embodiment of the drive ring using a belt and belt sleeve;

FIG. 7 is a perspective view of a treadle drive system with a positive engagement clutch;

FIG. 8 is a partial perspective view in partial section of an alternate embodiment of the treadle drive system with two drive lines attached at one end by springs;

FIG. 9 is a partial perspective view of the drive system applied to a pump;

FIG. 10 is a partial perspective view of the drive system applied to a variable resistance exercise device;

FIG. 11 is a partial perspective view of the drive system applied to a generator;

FIG. 12 is a perspective view of a three-wheeled vehicle employing the treadle drive system with a positive engagement clutch;

FIG. 13 is a partial perspective view of the rear drive wheel of the three-wheeled vehicle elevated on rollers for use as a stationary exercise device.

BEST MODE FOR CARRYING OUT THE INVENTION

In FIG. 7 a treadle drive system employs a positive engagement clutch, as seen in FIGS. 1 and 3. The treadle drive system is powered by downward stepping motion on a pair of treadles 95 spaced apart in parallel with both treadles hinged at pivot points 98 and 99 at a forward end and equipped with a foot-resting area 93 at a rearward end with a skid resistant surface.

Each of two ends of a flexible drive line 77 and 79 is attached to an inside edge of each treadle 95 between the forward and rearward ends of the each treadle. The flexible drive line extends from each treadle upwardly to drive each of two parallel rotating driver means 28 and 34, which driver means each engage a drive cylinder or shaft 38 (in FIGS. 1 and 2), and the driver means alternately rotate the drive shaft in a forward direction with one-way roller clutches 30 and 36.

In a preferred embodiment of the invention having a single flexible drive line, a reversible rotating means such as an idler gear 86 is positioned between and spaced from the two parallel rotating driver means 28 and 34. A section of the flexible drive line 79A passes over the idler gear to form a linkage between the two parallel rotating driver means. In this preferred embodiment the flexible drive line is a chain 79 engaging sprocket driver means 28 and 34. A transition link 87 orients the chain loop 79A ninety degrees from the remainder of the chain 77 and 79 in order to pass over the idler gear sprocket 86, which is at a right angle to sprockets 28 and 34.

In FIG. 8 an alternate embodiment of the treadle drive has two separate flexible line drives (chains) 77A and 79A, one from each treadle. The drive lines end in tension springs 83 and 85 within the housing 84, thereby allowing each treadle to operate independently of the other with the springs causing each treadle to return to an elevated position after stepping down on the treadle.

A third rotating ring, a driven means 45, is positioned in a disengageable rotational relation to the drive shaft 38, wherein the third rotating drive means drives an external rotating member, such as the sprocket 80 in FIG. 7 via the chain 75. In FIGS. 1 and 3 the third rotating drive or driven means comprises a drive ring 42 with a sprocket 45, In this embodiment concentrically encircling the drive shaft 38. Alternately the flexible drive line may comprise, as in FIG. 4, a beaded cable 64 and the drive or driven means comprise corresponding sprocket 66 with receptacles to accept the beads, or, in FIG. 5, a cable 67 and the drive or driven means comprise pulleys 68, or, as in FIG. 6, a belt 71 and the drive or driven means comprise belt sleeves 72.

In the preferred embodiment of FIG. 1 a positive engagement clutch means alternately engages and disengages the drive shaft 38 with the driven ring 45. The drive shaft comprises a hollow drive cylinder 38, and the drive cylinder is provided with two opposing transverse holes 39 and 40 through the drive cylinder and the driven ring 42 is provided with at least two mating opposing openings 41 and 44 in an interior surface contacting the drive cylinder. The positive engagement clutch means comprises the spring loaded means of FIG. 1 to engage and disengage the solid members (pins 26 and 31) through the holes 40 and 39 in the drive cylinder and the openings 44 and 41 in the driven ring.

Inserted within the hollow drive cylinder 38, is a simple push-pull shaft 21 having a push-pull means on an outer end outside the drive cylinder (attached knob 20 in FIG. 1 or remote cable actuating knob 50 alternate embodiment in FIG. 2). Rigidly connected to an inner end of the push-pull shaft, is a cup 54 having an open end with a rigid rim and a transverse rod 24 attached across the open end of the cup. The pins 26 and 31 are normally inserted through the holes 40 and 39 in the drive cylinder 38 and into the openings 44 and 41 in the driven ring 42 with the pins held in place by the force of the V-shaped spring, thereby positively engaging the drive cylinder and the driven ring at two points.

Pushing the push-pull shaft 21 causes contact of the rigid rim of the cup with the two sloping sides 25 and 29 of the V-shaped spring to compress the sides of the V-shaped spring thereby retracting the pins 26 and 31 from the openings 44 and 41 in the driven ring 42 to disengage the driven ring from the drive cylinder. Pulling on the push-pull shaft 21 withdraws the outer rim of the cup from over the V-shaped spring enabling it to expand thereby causing the pins to insert out into the openings in the driven ring, thereby re-engaging the drive cylinder and the driven ring. Additional mating opposing openings 46 and 47 (shown dashed on the driven ring) facilitate engagement of the pins in the openings with less degrees of rotation before engagement. No lateral displacement occurs between the drive cylinder and the driven ring due to retaining rings 35 (shown in FIG. 3) in cylinder grooves 43 (shown in FIG. 1), shoulders, press fit or other mechanical means, on both sides of the driven ring, enabling the drive system to be maintained in proper alignment at all times. In FIG. 3 the drive cylinder is rotatably supported by a bearing 57 (shown with dashed lines).

In FIG. 2 an alternate embodiment of the push-pull assembly of the positive engagement clutch comprises a cup 54A opening into the drive cylinder with a rigid rim on the open end of the cup. Two opposing arms 61 and 63 are rigidly connected to the rigid rim of the cup and extend through the drive cylinder. The two opposing arms at an opposite end are rigidly connected to a push-pull shaft 21A by a disc 65. A transverse rod 24 is attached between two opposing sides of the cup. The pins 26 and 31 of the V-shaped spring around the transverse rod are normally inserted through the holes in the drive cylinder and into the openings in the driven ring with the pins held in place by the force of the V-shaped spring with sloping sides 25 and 29, thereby positively engaging the drive cylinder and the drive ring at two points.

Pulling the push-pull shaft causes contact of the rigid rim of the cup with the sloping sides of the V-shaped spring to compress the sides of the V-shaped spring thereby retracting the pins to disengage the driven ring from the drive cylinder. Pushing on the push-pull shaft causes the rigid rim of the cup to release the sloping sides of the V-shaped spring to expand causing the pins to insert into the openings in the driven ring, thereby re-engaging the drive cylinder and the driven ring.

The ends of the flexible drive chain 77 and 79 are attached to inside edges 92 anywhere along the treadle arms well in front of the maximum power application point at the rear of the footrest portion 93 of the treadles. Moving the attaching points forward increases mechanical advantage. Choosing equal postilions of the two drive line attaching points along the treadles creates an equal mechanical advantage in both treadles. If the drive line attaching points are positioned differently on the two treadles one treadle will become a constant length lever of greater mechanical advantage than the other treadle. The treadles pivot from a hinge positioned at the front or heel of the treadle drive system providing the longest lever arm for the system. Providing an acute angle bend from the horizontal in the treadle arm inclines the treadle downward toward the back of the treadle at the foot pad. This foot pad orientation maintains the foot in a more natural position, parallel to the operating surface, when the treadle is at the beginning of the stroke when power is applied, and in operating the treadle, this foot pad orientation tends to keep the operator's heel in firm contact with the treadle pad so that maximum weight and force are applied at the back of the treadle and also reduces the amount of flexing in the ankle and knee in a natural walking or stepping movement of the foot and leg.

A narrow vertical housing 84 encases the flexible drive chain leading to the crossover rotating means 86, wherein at a bottom end of the vertical housing protrusions 88 and 90 from the housing act as stops for the treadles engaging protruding ridges 91 at the rear of the treadles. The angled treadle arms 96 have non-skid surfaces 93 on the foot pads 95 and side rails 94.

In FIG. 12 the external rotating member comprises the drive hub 125 of a multiple wheeled vehicle via a chain 75 and derailer 123 operated by a shift 130 on handle bar 132 which also supports one or more brake levers 131 and 134. Steering post supports 140 and 141 (shown in dashed lines) maintain the post in a rigid position. Turning the handle bar 132 turns the plate 136 to pull either of the rods 135 to turn the front wheels 126. The vertical housing 84 further comprises a support for a seat 121, so that the treadle cycle may be operated in a standing or sitting position. A chain guard 122 (shown in dashed lines) encases the drive chains from the treadles and the rear wheel 124. In FIG. 13 a drive wheel 124 of the multiple wheeled vehicle is elevated and supported in place by a roller 150 on a stand 152 for use as a stationary exerciser. The treadle cycle of FIG. 12 then becomes the equivalent of a stair stepping exercise device.

In FIG. 9 the external rotating member comprises an element on a pump 111 with a pulley 106 and V-belt 108 drive. Liquid is pumped through hoses 110 and 112.

In FIG. 10 the external rotating member comprises a variable resistance element such as a flywheel 100 on a piece of exercise equipment, with a variable resistance created by a brake 102 operated by a cable 104.

In FIG. 11 the external rotating member comprises an armature on an electric generator 116 which may be connected to the drive by a pulley 106 and V-belt 108. Electricity may be transmitted by wires 120 directly to an electric device or to a storage battery.

Many other applications of the treadle drive system with the positive engagement clutch are possible including driving rotary tools and instruments.

It is understood that the preceding description is given merely by way of illustration and not in limitation of the invention and that various modifications may be made thereto without departing from the spirit of the invention as claimed.

We claim:

1. A treadle drive system with a positive engagement clutch comprising:
   a pair of treadles spaced apart in parallel with both treadles hinged at an end and equipped with a footresting area at a rearward end;
   attached to an inside edge of each treadle anywhere along the treadle edge each of two ends of a drive line;
   wherein the drive line extends from each treadle to drive each of two parallel rotating drive means, which drive means each engage a drive shaft and the drive means alternately rotate the drive shaft;
   a third rotating drive means positioned in a disengageable rotational relation to the drive shaft, wherein the third rotating drive means drives an external rotating member;
   a positive engagement clutch means which alternately engages and disengages the drive shaft with the third rotating drive means wherein the third rotating drive means comprises a driven ring encircling the drive shaft and the positive engagement clutch means comprises at least one solid member reversibly engaging and disengaging the driven ring and the drive shaft;
   wherein the drive shaft comprises a hollow drive cylinder, and wherein the drive cylinder is provided with two opposing transverse holes through the drive cylinder and the driven rink is provided with at least one pair of mating opposing openings in an interior surface contacting the drive cylinder; wherein the positive engagement clutch means comprises a spring loaded means to engage and disengage the solid member through the holes in the drive cylinder and the openings in the driven ring.

2. The invention of claim 1 wherein a single drive line is used with each end of the drive line attached to a treadle anywhere on an inside edge of the treadle, and further comprising a reversible rotating means between and spaced from the two parallel rotating drive means, over which reversible rotating means a section of the flexible drive line passes to form a loop extending from the two parallel rotating drive means.

3. The invention of claim 1 wherein two separate drive lines are used, wherein one end of each drive line is attached to a treadle and the other end of each drive line is attached to a spring.

4. The invention of claim 1 further comprising, inserted within the drive cylinder, a simple push-pull shaft having a push-pull means on an outer end outside the drive cylinder, and, rigidly connected to an inner end of the push-pull shaft, a cup opening away from the push-pull shaft with first usage a rigid rim on an open end cup facing into the drive cylinder, and a transverse rod attached across the open end of the cup, and captured between the transverse rod and the cup, extending away from the push-pull shaft, a V-shaped spring having an open end formed by two sloping sides with a hardened steel pin on an outside face of each sloping side at an outer end, and wherein the hardened pins comprise the solid members reversibly interconnecting the driven ring and the drive cylinder enabling the pins to insert into and retract out of engagment with the driven ring to engage and disengage the driven ring with the drive cylinder.

5. The invention of claim 4 wherein the hardened pins are normally inserted through the holes in the drive cylinder and into the openings in the driven ring with the pins held in place by the force of the V-shaped spring, thereby positively engaging the drive cylinder and the driven ring at two points; wherein pushing the push-pull shaft causes contact of the rigid rim of the cup with the two sloping sides of the V-shaped spring to compress the sides of the V-shaped spring thereby retracting the pins from the openings in the driven ring to disengage the driven ring from the drive cylinder, and pulling on the push-pull shaft releases contact of the rigid rim of the cup with the V-shaped spring sides enabling the V-shaped spring to expand thereby releasing the sides of the spring and causing the pins to insert out into the openings in the driven ring, thereby re-engaging the drive cylinder and the driven ring.

6. The invention of claim 4 wherein the shaft extension comprises a cup opening into the drive cylinder with a rigid rim on an open end of the cup facing into the drive cylinder, two opposing arms rigidly connected to the rigid rim of the cup and extending through the drive cylinder, wherein the two opposing arms at an opposite end are rigidly connected to a disc and to a push-pull shaft, and the transverse rod is attached between two opposing sides of the open end of the cup, and wherein the pins are normally inserted through the holes in the drive cylinder and into the openings in the driven ring with the pins held in place by the force of the V-shaped spring, thereby positively engaging the drive cylinder and the driven ring at two points; wherein pulling the push-pull shaft causes contact of the rigid rim of the cup with the sloping sides of the V-shaped spring to compress the sides of the V-shaped spring thereby retracting the pins to disengage the driven ring from the drive cylinder, and pushing on the push-pull shaft causes the rigid rim of the cup to release the sloping sides of the V-shaped spring causing the spring to expand and the pins to insert back into the openings in the driven ring, thereby re-engaging the drive cylinder and the drive ring.

7. The invention of claim 4 wherein the ends of the flexible drive line are attached to inside edges at any point of the treadles in front of the maximum power application point at a rear footrest portion of the treadles not necessarily at points equidistant from the pivot points.

8. The invention of claim 7 wherein the treadles extend rearward from a front hinged portion with an acute angled bend at a forwardmost point of a rear footrest portion and the treadles incline downwardly at an acute angle along the footrest portion.

9. The invention of claim 1 further comprising a vertical housing encasing the drive line leading to the reversibly rotating means, wherein at a bottom end of the vertical housing protrusions from the housing act as stops for the treadles.

10. The invention of claim 9 wherein the external rotating member comprises the drive hub of a multiple wheeled vehicle and the vertical housing further comprises a support for a seat.

11. The invention of claim 4 wherein the flexible drive line comprises a chain and the drive means comprise sprockets.

12. The invention of claim 4 wherein the drive line comprises a cable and the drive means comprise pulleys.

13. The invention of claim 4 wherein the drive line comprises a beaded cable and the drive means comprise roller gears.

14. The invention of claim 4 wherein the drive line comprises a belt and the drive means comprises a belt sleeve.

15. The invention of claim 4 wherein the external rotating member comprises the drive hub of a multiple wheeled vehicle.

16. The invention of claim 14 wherein a drive wheel of the multiple wheeled vehicle is elevated and supported in place by at least one roller for use as a stationary exerciser.

17. The invention of claim 4 wherein the external rotating member comprises a variable resistance element on a piece of exercise equipment.

18. The invention of claim 4 wherein the external rotating member comprises an armature on an electric generator.

19. The invention of claim 4 wherein the external rotating member comprises an element on a pump.

* * * * *